United States Patent [19]

Clark et al.

[11] Patent Number: 4,861,992
[45] Date of Patent: Aug. 29, 1989

[54] TESTING OF THERMAL IMAGERS

[75] Inventors: Michael G. Clark, Gerrards Cross; Michael C. Wiltshire, High Wycombe, both of United Kingdom

[73] Assignee: The General Electric Company, p.l.c., United Kingdom

[21] Appl. No.: 124,993

[22] PCT Filed: Feb. 27, 1987

[86] PCT No.: PCT/GB87/00140
§ 371 Date: Nov. 12, 1987
§ 102(e) Date: Nov. 12, 1987

[87] PCT Pub. No.: WO87/05713
PCT Pub. Date: Sep. 24, 1987

[30] Foreign Application Priority Data
Mar. 19, 1986 [GB] United Kingdom ............... 8606783

[51] Int. Cl.$^4$ ............................................. G03C 5/16
[52] U.S. Cl. ......................... 250/316.1; 350/350 R; 350/350 S
[58] Field of Search ............... 250/316.1; 350/350 R, 350/350 S, 351

[56] References Cited
U.S. PATENT DOCUMENTS

| 3,796,999 | 3/1974 | Kahn | 350/350 S |
| 4,040,047 | 8/1977 | Hareng et al. | 350/350 S |
| 4,059,340 | 11/1977 | Kahn | 350/350 R |
| 4,263,515 | 4/1981 | Runciman | 250/494 |
| 4,639,722 | 1/1987 | Urabe | 350/350 S |
| 4,659,502 | 4/1987 | Fearon et al. | 350/350 S |
| 4,693,557 | 9/1987 | Fergason | 350/350 S |

FOREIGN PATENT DOCUMENTS

| 0087477 | 3/1983 | European Pat. Off. |
| 1536568 | 12/1978 | United Kingdom |
| 2140023 | 11/1984 | United Kingdom |
| 2161951 | 1/1986 | United Kingdom |
| 2162333 | 1/1986 | United Kingdom |
| 2162715 | 2/1986 | United Kingdom |

OTHER PUBLICATIONS

APIE vol. 98, Assessment of Imaging Systems (Sira Nov. 1976 London), "The Laboratory Evaluation of Thermal Imaging Systems", by A. R. Newbery & R. Worswick, pp. 96–104.
Appl. Phys. Lett., vol. 22, No. 3, 1 Feb. 1973, "Ir-Laser-Addressed Thermo-Optic Smectic Liquid-Crystal Storage Displays", by Frederick J. Kahn, pp. 111–113.

Primary Examiner—Bruce C. Anderson
Attorney, Agent, or Firm—Kirschstein, Ottinger, Israel & Schiffmiller

[57] ABSTRACT

A method of testing thermal imagers includes heating selected portions of a quantity of a smectic liquid crystal material (9) with a laser (25) such that the material in the selected portions changes from a homeotropic texture in which it is transparent to incident infrared radiation to a focal conic texture in which it scatters incident infrared radiation. An infrared source (27) is arranged to direct infrared radiation onto the quantity (9) so as to read the pattern of selected portions across the quantity.

9 Claims, 1 Drawing Sheet

TESTING OF THERMAL IMAGERS

BACKGROUND OF THE INVENTION

1. Field of the Invention

This invention relates to thermal imager testing devices.

2. Description of Related Art

Thermal imager testing devices are used in the testing of thermal imagers so as to avoid the necessity of field trials for the imagers. This application requires that the device present to the thermal imager pictures sufficiently similar to those actually seen in the field for the test to be realistic.

One example of a known thermal imager testing device uses a vanadium dioxide thin film having a thermodynamic phase transition at a predetermined temperature which causes the film to switch from having high infrared transmission to low infrared transmission. The existence of a hysteresis in this phase transition enables the film to be used as an optical storage medium, such that by heating portions of the film above the transition temperature, and placing the film in an optical projector operating in the infrared, scene information written on the film may be projected into the field of view of a thermal imager to be tested.

Such a device suffers the disadvantages however of lack of accuracy and the inability to incorporate a grey scale.

Another example of a known thermal imager testing device comprises a nematic liquid crystal cell incorporating a photoconductive layer. An image shone on the photoconductive layer causes the molecules within selected areas of the liquid crystal to change their orientation within the cell, thus changing the transmission characteristics of incident infrared light through the cell.

Such a device suffers the disadvantage however that the response time of the liquid crystal to changes in the image is relatively slow.

SUMMARY OF THE INVENTION

It is an object of the present invention to provide a thermal imager testing device in which some of the problems inherent in known thermal imager testing devices are at least alleviated.

According to the present invention a thermal imager testing device comprises: a quantity of a smectic liquid crystal material; means for heating selected portions of the quantity such that the material in the selected portions changes from a state in which it is transparent to incident infrared radiation to a state in which it scatters incident infrared radiation; and means for directing infrared radiation onto the quantity so as to produce an indication of the pattern of selected portions across the quantity.

The material suitably has a homeotropic texture in said state in which it is transparent, and a focal conic texture in said state in which it scatters.

The device suitably includes means for applying a voltage across the quantity effective to cause at least some of the material to adopt said state in which it is transparent.

Preferably the device includes a plurality of said quantities, and means for sequentially exposing said quantities to said means for heating and to said means for directing infrared radiation.

BRIEF DESCRIPTION OF THE DRAWINGS

One thermal imager testing device in accordance with the invention will now be described, by way of example only, with reference to the accompanying drawing in which.

DETAILED DESCRIPTION OF THE PREFERRED EMBODIMENT

Figure 1:
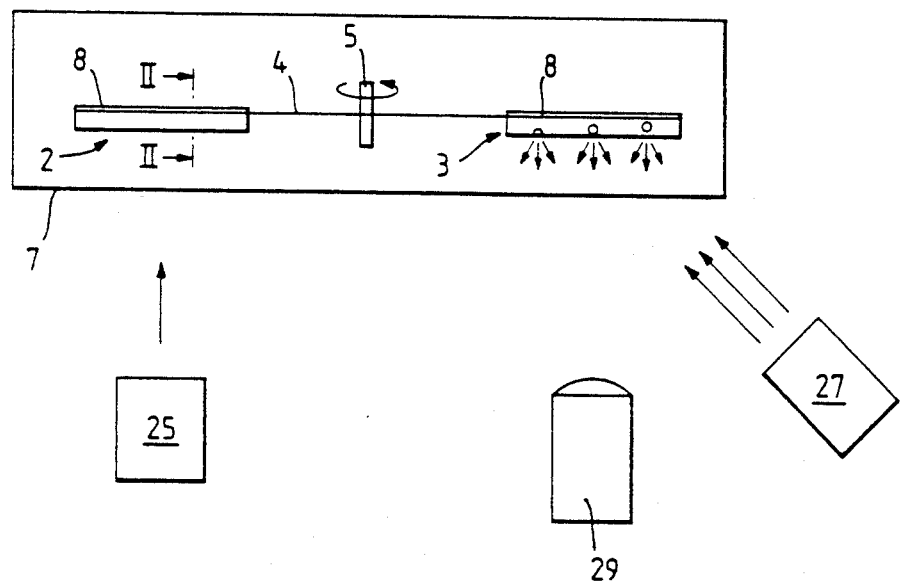
FIG. 1 is a schematic plan view of the device.

Referring firstly to FIG. 1, the device includes a number of liquid crystal cells only two such cells 2, 3 being shown in the drawing for the sake of simplicity. The cells 2, 3 are attached to a framework, indicated as 4, the framework being rotatable about a pivot 5. The framework 4 together with the cells 2, 3 are located in a temperature controlled enclosure, indicated as 7, each cell 2, 3 being provided with a backing plate 8 held at a required temperature corresponding to the lowest temperature of a thermal image to be synthesized by the device.

Figure 2:
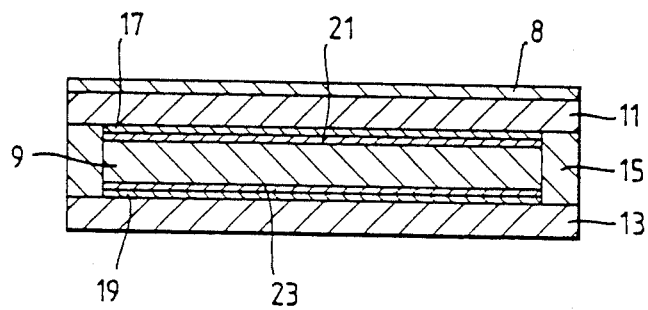
FIG. 2 is a schematic diagram of a section along the line II—II of one of the liquid crystal cells incorporated in the device of FIG. 1.

Referring now also to FIG. 2, each cell 2, 3 comprises a quantity of the smectic A phase liquid crystal 9 known as S2 produced by BDH Chemicals Limited, the crystal 9 being doped to a level of 1% with the dye D16 produced by BDH Chemicals Limited, this dye having an absorption band at a wavelength so as to absorb light in the visible or near infrared wavelength bands. The liquid crystal 9 is contained between two parallel plates 11, 13 of a material transmissive to light both in the visible or near infrared and the 8–14 $\mu$m wavebands, for example ZnS or ZnSe, the plates having a spacing of between 5 and 50 $\mu$m, separated by spacers 15. The inner surfaces of the plates are coated with respective layers 17, 19 of indium tin oxide constituting electrodes for the cell, connections (not shown) and drive circuitry (also not shown) being provided to the electrodes to enable AC voltages to be applied across the liquid crystal 9 as described hereafter. Overlying the electrodes 17, 19 there are provided respective layers 21, 23 of a surfactant, such as lecithin, which causes the liquid crystal at the surfactant liquid crystal interface to adopt a homeotropic alignment.

The device further includes a laser 25 producing light in the visible or near infrared, and an infrared source 27 producing radiation within the 8–14 $\mu$m wavelength band.

In use of the device to test a thermal imager 29 an RMS voltage greater than a "bulk erase" threshold voltage $V_{be}$ for the particular liquid crystal 9 is applied across the liquid crystal within one 2 of the cells, a voltage of this magnitude being effective to cause the crystal 9 to adopt a homeotropic texture in which the optic axes of the molecules of the crystal are normal to the plane of the plates 11, 13 throughout the cell. The laser 25 is then used to produce a light beam which is scanned across the cell 2, the beam pausing for a short time at desired points within the cell. At these points local heating of the liquid crystal above the isotropic transition temperature takes place, this causing the liquid crystal at these points to adopt a "focal conic" texture in which the optic axes of the molecules of the liquid crystal show rapid spatial variations. The actual heating process is very quick, while the subsequent cooling and development of the focal conic texture will typically take a few milliseconds. As both the homeotropic and focal conic textures are stable however, the laser beam may be moved on to heat another point immediately after the required amount of heat has been absorbed at one point within the liquid crystal, an energy of typically 1nJ μm² being sufficient.

Thus the laser beam may be used to "write" the cell 2 to produce a pattern of homeotropic and focal conic textures within the liquid crystal across the cell 2, each point within the pattern corresponding to a pixel of the thermal image of the scene which it is required to synthesize.

To "read" the thus written cell 2, the cell 2 is rotated on the framework 4 about the pivot 5 to a position away from the laser 25, to a position where the infrared source 27 is able to direct radiation onto the cell as shown in the FIG. 1. In the areas of the liquid crystal having a homeotropic texture, the crystal is transparent to the infrared radiation. In the areas of the liquid crystal having a focal conic texture however because of the non-zero birefringence of the crystal in these areas the radiation is scattered.

Thus in the areas of the liquid crystal which are transparent to the radiation, the thermal imager 29 will view a background corresponding to the low temperature of the backing plate 8, while the areas of the liquid crystal having a focal conic texture will scatter photons from the infrared source into the acceptance cone of the detector thus providing an indication of the pattern across the cell 2. The output signal of the thermal imager 29 may then be inspected to determine the functioning of the imager.

It will be appreciated that while one cell 2 is being read the other cell 3 may be in the process of being written by the laser 25. Thus in a practical device in accordance with the invention, a large number of cells will be supported by the framework 4, such that rapid rotation of the cells on the framework past the infrared source 27 will enable a flicker-free cinematic type image to be presented to the thermal imager 29 so as to simulate a changing real life scene. After "reading" each cell a voltage greater than $V_{be}$ will usually be applied to the cell to erase it for future rewriting. In some circumstances, however, it may be more convenient to cause selective erasure of the cell by writing over areas to be erased in the presence of a lower "selective erase" voltage $V_{se}$.

It will be appreciated that instead of the thermal imager 29 viewing a background held at the lowest temperature of the scene being synthesized, in some circumstances it may be more useful to use a diffuse infrared source representing the highest temperature in the scene, the focal conic texture points within the liquid crystal scattering the photons from the infrared source out of the acceptance cone of the thermal imager 29 to represent pixels of the scene being synthesized which are at lower temperatures. It will be appreciated that the cells may be "read" by the infrared beam either by reflection of the beam as shown in FIG. 1, or by transmission of the beam through the cell. The form of the infrared "read" beam, i.e. diffuse or narrow, will generally be determined by the characteristics of the scattering process within the liquid crystal, and also the characteristics of the thermal imaging device being tested.

The "writing" beam may also take several forms other than the scanned laser beam described herebefore. The whole cell may, for example, be addressed in parallel by projecting the required image onto the cell with an intense optical beam. If pre-recorded scenes are to be synthesized a cinematographic apparatus may be used, or in the case where the scenes are recorded on a video apparatus, a projection television apparatus may be used. In order to achieve a "grey" level each point of the liquid crystal representing a pixel of the scene being synthesized may comprise a number of smaller points representing subpixels of the scene, whose size, shape and spacing are designed to achieve the required grey level. In order to avoid spatial "fixed pattern" noise the distribution of the small points for a given grey level may be varied according to a dither algorithm.

It will be appreciated that many other smectic liquid crystals other than the S2 crystal described herebefore by way of example may be incorporated in a thermal picture synthesizer in accordance with the invention. The liquid crystals will however generally be of the smectic A phase, and usually should have a short nematic or cholesteric phase between the smectic and isotropic phases, although this may be not always be necessary. The liquid crystal may be either a monomeric liquid crystal, or a side-chain polymeric material in which mesogenic groups are attached as side chains to a polymer chain. Generally the liquid crystal should contain cyclohexyl rather than phenyl rings, since cyclohexyl rings have a smaller absorption of infrared radiation in the 8–14 μm waveband in which most thermal imagers are used. Where the liquid crystal includes its own chromophores, the dye used to absorb the light used to "write" the cell may in some cases be omitted. The dye may also be omitted if the cell incorporates a visible or near infrared absorbing layer between one of the plates and the adjacent surfactant layer.

It will be appreciated that while in the synthesizer described herebefore by way of example each cell comprises a liquid crystal material confined between two plates which are each transmissive to radiation both in the visible or near infrared and the 8–14 μm wavebands, each cell may alternatively include plates of different materials, one plate being of a material transparent in the visible or near infrared, for example glass, and the other plate being of a material transparent to 8–14 μm radiation, for example germanium. It will be appreciated that where a germanium plate is used in the cell a conductive electrode layer will be unnecessary on this particular plate. Where the cells do include plates of different materials in this way the visible or near infrared "write" beam and the 8–14 μm "read" beam will of course be directed onto different sides of the cell.

It will also be appreciated that while the rotating framework 4 described in the above example is a particularly simple way of moving the cells relative to the infrared source many other mechanisms for moving the cells may be devised in particular where the liquid crystal is in the form of a polymer the synthesizer may include a single "cell" in the form of an endless loop which revolves around the "reading" and "writing" beams.

It will further be appreciated that the rotating framework of the device described herebefore by way of example may be replaced by one or more moving optical components such as mirrors or mechanical or electronic shutters which enable the cells to be sequentially written and read.

We claim:

1. A method of testing a thermal imager having a predetermined operational infrared waveband, comprising the steps of:
   (a) heating selected portions of a quantity of smectic liquid crystal material such that the material in said selected portions changes from a state in which it is transparent to incident infrared radiation to a state in which it scatters incident infrared radiation;
   (b) directing onto said material thermal infrared radiation within said waveband of said thermal imager under test from a first radiation source so that by scattering of said thermal infrared radiation from said selected portions across said quantity a thermal image is generated; and
   (c) using said thermal image for testing said thermal imager.

2. A method according to claim 1, in which the heating step is effected by a second radiation source, a means for absorbing radiation emitted from said second source being associated with said material.

3. A method according to claim 2, in which said material has a homeotropic texture in said state in which it is transparent, and a focal conic texture in said state in which it scatters.

4. A method according to claim 3, in which said material is a smectic A phase liquid crystal.

5. A method according to claim 3, in which said material includes cyclohexyl rings.

6. A method according to claim 1, in which said means for absorbing is a dye dissolved in said liquid crystal material.

7. A method according to claim 1, in which said second radiation source is a visible or near infrared light source.

8. A method according to claim 7, including applying a voltage across said quantity to cause at least some of said material to adopt said state in which it is transparent.

9. A method according to claim 1, wherein a plurality of said quantities are heated sequentially and are irradiated sequentially by said first radiation source to generate respective thermal images for testing said thermal imager.

* * * * *